United States Patent [19]
Goss

[11] Patent Number: 4,956,863
[45] Date of Patent: Sep. 11, 1990

[54] CRYPTOGRAPHIC METHOD AND APPARATUS FOR PUBLIC KEY EXCHANGE WITH AUTHENTICATION

[75] Inventor: Kenneth C Goss, Oceano, Calif.

[73] Assignee: TRW Inc., Redondo Beach, Calif.

[21] Appl. No.: 339,555

[22] Filed: Apr. 17, 1989

[51] Int. Cl.$^5$ ............................................. H04K 1/00
[52] U.S. Cl. ...................................... 380/30; 380/18; 380/23; 380/44; 380/47
[58] Field of Search ............................. 380/30, 44–47, 380/18, 21, 23, 25, 43

[56] References Cited

U.S. PATENT DOCUMENTS

| | | | |
|---|---|---|---|
| 4,200,770 | 4/1980 | Hellman et al. ...................... | 380/30 |
| 4,386,233 | 5/1983 | Smid et al. ........................... | 380/25 |
| 4,748,668 | 5/1988 | Shamir et al. ....................... | 380/30 |
| 4,759,063 | 7/1988 | Chaum ................................. | 380/30 |
| 4,759,064 | 7/1988 | Chaum ................................. | 380/30 |

*Primary Examiner*—Stephen C. Buczinski
*Assistant Examiner*—Bernarr Earl Gregory
*Attorney, Agent, or Firm*—Noel F. Heal; Benjamin DeWitt

[57] ABSTRACT

A technique for use in a public key exchange cryptographic system, in which two user devices establish a common session key by exchanging information over an insecure communication channel, and in which each user can authenticate the identity of the other, without the need for a key distribution center. Each device has a previously stored unique random number Xi, and a previously stored composite quantity that is formed by transforming Xi to Yi using a transformation of which the inverse in computationally infeasible; then concatenating Yi with a publicly known device identifier, and digitally signing the quantity. Before a communication session is established, two user devices exchange their signed composite quantities, transform them to unsigned form, and authenticate the identity of the other user. Then each device generates the same session key by transforming the received Y value with its own X value. For further security, each device also generates another random number X'i, which is transformed to a corresponding number Y'i. These Y'i values are also exchanged, and the session key is generated in each device, using a transformation that involves the device's own Xi and X'i number and the Yi and Y'i numbers received from the other device.

16 Claims, 3 Drawing Sheets

CRYPTOGRAPHIC METHOD AND APPARATUS FOR PUBLIC KEY EXCHANGE WITH AUTHENTICATION

BACKGROUND OF THE INVENTION

This invention relates generally to cryptographic systems and, more particularly, to cryptographic systems in which an exchange of information on an unsecured communications channel is used to establish a common cipher key for encryption and decryption of subsequently transmitted messages. Cryptographic systems are used in a variety of applications requiring the secure transmission of information from one point to another in a communications network. Secure transmission may be needed between computers, telephones, facsimile machines, or other devices. The principal goal of encryption is the same in each case: to render the communicated data secure from unauthorized eavesdropping.

By way of definition, "plaintext" is used to refer to a message before processing by a cryptographic system. "Ciphertext" is the form that the message takes during transmission over a communications channel. "Encryption" or "encipherment" is the process of transformation from plaintext to ciphertext. "Decryption" or "decipherment" is the process of transformation from ciphertext to plaintext. Both encryption and decryption are controlled by a "cipher key" or keys. Without knowledge of the encryption key, a message cannot be encrypted, even with knowledge of the encrypting process. Similarly, without knowledge of the decryption key, the message cannot be decrypted, even with knowledge of the decrypting process.

More specifically, a cryptographic system can be thought of as having an enciphering transformation $E_k$, which is defined by an enciphering algorithm E that is used in all enciphering operations, and a key K that distinguishes $E_k$ from other operations using the algorithm E. The transformation $E_k$ encrypts a plaintext message M into an encrypted message, or ciphertext C. Similarly, the decryption is performed by a transformation $D_k$ defined by a decryption algorithm D and a key K.

Dorothy E. R. Denning, in "Cryptography and Data Security," Addison-Wesley Publishing Co. 1983, suggests that, for complete secrecy of the transmitted that it should be computationally infeasible for anyone to systematically determine the deciphering transformation $D_k$ from intercepted ciphertext C, even if the corresponding plaintext M is known. The second is that it should be computationally infeasible to systematically determine plaintext M from intercepted ciphertext C. Another goal of cryptography systems is that of data authenticity. This requires that someone should not be able to substitute false ciphertext C' for ciphertext C without detection.

By way of further background, cryptographic systems may be classified as either "symmetric" or "asymmetric." In symmetric systems, the enciphering and deciphering keys are either the same easily determined from each other. When two parties wish to communicate through a symmetric cryptographic system, they must first agree on a key, and the key must be transferred from one party to the other by some secure means. This usually requires that keys be agreed upon in advance, perhaps to be changed on an agreed timetable, and transmitted by courier or some other secured method. Once the keys are known to the parties, the exchange of messages can proceed through the cryptographic system.

An asymmetric cryptosystem is one in which the enciphering and deciphering keys differ in such a way that at least one key is computationally infeasible to determine from the other. Thus, one of the transformations $E_k$ or $D_k$ can be revealed without endangering the other.

In 1976, the concept of a "public key" encryption system was introduced by W. Diffie and M. Hellman, "New Directions in Cryptography," IEEE Trans. on Info. Theory, Vol. IT-22(6), pp. 644–654 (Nov. 1976). In a public key system, each user has a public key and private key, and two users can communicate knowing only each other's public keys. This permits the establishment of a secured communication channel between two users without having to exchange "secret" keys before the communication can begin. As pointed out in the previously cited text by Denning, a public key system can be operated to provide secrecy by using a private key for decryption; authenticity by using a private key for encryption; or both, by using two sets of encryptions and decryptions.

In general, asymmetric cryptographic systems require more computational "energy" for encryption and decryption than symmetric systems. Therefore, a common development has been a hybrid system in which an asymmetric system, such as a public key system, is first used to establish a "session key" for use between two parties wishing to communicate. Then this common session key is used in a conventional symmetric cryptographic system to transmit messages from one user to the other. Diffie and Hellman have proposed such a public key system for the exchange of keys on an unsecured communications channel. However, as will be described, the Diffie-Hellman public key system is subject to active eavesdropping. That is to say, it provides no foolproof authentication of its messages. With knowledge of the public keys, an eavesdropper can decrypt received ciphertext, and then re-encrypt the resulting plaintext for transmission to the intended receiver, who has no way of knowing that the message has been intercepted. The present invention relates to a significant improvement in techniques for public key exchange or public key management.

One possible solution to the authentication problem in public key management, is to establish a key distribution center, which issues secret keys to authorized users. The center provides the basis for identity authentication of transmitted messages. In one typical technique, a user wishing to transmit to another user sends his and the other user's identities to the center; e.g. (A,B). The center sends to A the ciphertext message $E_A(B,K,T,C)$, where $E_A$ is the enciphering transformation derived from A's private key, K is the session key, T is the current date and time, and $C = E_B(A,K,T)$, where $E_B$ is the enciphering transformation derived from B's private key. Then A sends to B the message C. Thus A can send to B the session key K encrypted with B's private key; yet A has no knowledge of B's private key. Moreover, B can verify that the message truly came from A, and both parties have the time code for further message identity authentication. The difficulty, of course, is that a central facility must be established as a repository of private keys, and it must be administered by some entity that is trusted by all users. This difficulty is almost impossible to overcome in some applications, and there is, therefore, a significant need for an alternative approach to public key management. The present invention fulfills this need.

Although the present invention has general application in many areas of communication employing public key management and exchange, the invention was first developed to satisfy a specific need in communication by facsimile (FAX) machines. As is now well known, FAX machines transmit and receive graphic images over ordinary telephone networks, by first reducing the images to digital codes, which are then transmitted, after appropriate modulation, over the telephone lines. FAX machines are being used at a rapidly increasing rate for the transmission of business information, much of which is of a confidential nature, over lines that are unsecured. There is a substantial risk of loss of the confidentiality of this imformation, either by deliberate eavesdropping, or by accidental transmission to an incorrectly dialed telephone number.

Ideally, what is needed is an encrypting/decrypting box connectable between the FAX machine and the telephone line, such that secured communications can take place between two similarly equipped users, with complete secrecy of data, and identity authentication between the users. For most users, a prior exchange of secret keys would be so inconvenient that they could just as well exchange the message itself by the same secret technique. A public key exchange system is by far the most convenient solution but each available variation of these systems has its own problems, as discussed above. The Diffie-Hellman approach lacks the means to properly authenticate a message, and although a key distribution center would solve this problem, as a practical matter no such center exists for FAX machine users, and none is likely to be established in the near future. Accordingly, one aspect of the present invention is a key management technique that is directly applicable to data transmission using FAX machines.

SUMMARY OF THE INVENTION

The present invention resides in a public key cryptographic system that accomplishes both secrecy and identity authentication, without the need for a key distribution center or other public facility, and without the need for double encryption and double decryption of messages. Basically, the invention achieves these goals by using a digitally signed composite quantity that is pre-stored in each user communication device. In contrast with the conventional Diffie-Hellman technique, in which random numbers Xi are selected for each communication session, the present invention requires that a unique number Xi be preselected and pre-stored in each device that is manufactured. Also stored in the device is the signed composite of a Yi value and a publicly known device identifier. The Yi value is obtained by a transformation from the Xi value, using a transformation that is practically irreversible.

Before secure communications are established, two devices exchange these digitally signed quantities, which may then be easily transformed into unsigned form. The resulting identifier information is used to authenticate the other user's identity, and the resulting Yi value from the other device is used in a transformation with Xi to establish a session key. Thus the session key is established without fear of passive or active eavesdropping, and each user is assured of the other's identity before proceeding with the transfer of a message encrypted with the session key that has been established.

One way of defining the invention is in terms of a session key generator, comprising storage means for storing a number of a first type selected prior to placing the key generator in service, and a digitally signed composite quantity containing both a unique and publicly known identifier of the session key generator and a number of a second type obtained by a practically irreversible transformation of the number of the first type. The session key generator has a first input connected to receive the number of the first type, and a second input connected to receive an input quantity transmitted over an insecure communications channel from another session key generator, the input quantity being digitally signed and containing both a publicly known identifier of the other session key generator and a number of the second type generated by a practically irreversible transformation of a number of the first type stored in the other session key generator. The session key generator also has a first output for transmitting the stored, digitally signed composite quantity over the insecure communications channel to the other session key generator, a second output, means for decoding the signed input quantity received at the second input, to obtain the identifier of the other session key generator and the received number of the second type, and means for generating a session key at the second output, by performing a practically irreversible transformation of the number of the second type received through the second input, using the number of the first type received through the first input.

For further security of the session key, the session key generator further includes a third input, connected to receive another number of the first type, generated randomly, and means for generating at the first output, for transmission with the digitally signed composite quantity, a number of the second type obtained by a practically irreversible transformation of the number of the first type received through the third input. The session key generator also includes means for receiving from the second input another number of the second type generated in and transmitted from the other session key generator. The means for generating a session key performs a practically irreversible transformation involving both numbers of the first type, received at the first and third inputs, and both numbers of the second type received at the second input, whereby a different session key may be generated for each message transmission session.

More specifically, the number of the second type stored in digitally signed form in the storage means is obtained by the transformation $Ya = \alpha^{Xa} \mod p$, where $Xa$ is the number of the first type stored in the storage means, and $\alpha$ and $p$ are publicly known transformation parameters. The number of the second type received in the digitally signed composite quantity from the other session key generator is designated $Yb$, and the means for generating the session key performs the transformation $K = Yb^{Xa} \mod p$.

When additional numbers $X'a$ and $X'b$ are also generated prior to transmission, the means for generating the session key performs the transformation $K = (Y'b)^{Xa} \mod p \oplus (Yb)^{X'a} \mod p$, where $X'a$ is the number of the first type that is randomly generated, $Y'b$ is the additional number of the second type received from the other session key generator, and the $\oplus$ symbol means an exclusive OR operation.

In terms of a novel method, the invention comprises the steps of transmitting from each device a digitally signed composite quantity to the other device, the composite quantity including a publicly known device identifier IDa and a number Ya derived by a practically irreversible transformation of a secret number Xa that it is unique to the device, receiving a similarly structured digitally signed composite quantity from the other device, and transforming the received digitally signed composite quantity into an unsigned composite quantity containing a device identifier IDb of the other device and a number Yb that was derived by transformation from a secret number Xb that is unique to the other device. Then the method performs the steps of verifying the identity of the other device from the device identifier IDb, and generating a session key by performing a practically irreversible transformation involving the numbers Xa and Yb.

Ideally, the method also includes the steps of generating another number X'a randomly prior to generation of a session key, transforming the number X'a to a number Y'a using a practically irreversible transformation, transmitting the number Y'a to the other device, and receiving a number Y'b from the other device. In this case, the step of generating a session key includes a practically irreversible transformation involving the numbers Xa, X'a, Yb and Y'b.

In particular, the transformations from X numbers to Y numbers is of the type $Y = \alpha^X \mod p$, where $\alpha$ and p are chosen to maximize irreversibility of the transformations, and the step of generating a session key includes the transformation $$K = (Y'b)^{Xa} \mod p \; \delta \; (Yb)^{X'a} \mod p,$$

where $\delta$ denotes an exclusive OR operation.

It will be appreciated from this brief summary that the present invention represents a significant advance in the field of cryptography. In particular, the invention provides for both secrecy and identity authenticity when exchanging transmissions with another user to establish a common session key. Other aspects and advantages of the invention will become apparent from the following more detailed description, taken in conjunction with the accompanying drawings.

DESCRIPTION OF THE PREFERRED EMBODIMENT

As shown in the accompanying drawings for purposes of illustration, the present invention is concerned with a public key cryptographic system. As discussed at length in the preceding background section of this specification, public key systems have, prior to this invention, been unable to provide both secrecy and identity authentication of a message without either a costly double transformation at each end of the communications channel, or the use of key distribution center.

U.S. Pat. No. 4,200,770 to Hellman et al. discloses a cryptographic apparatus and method in which two parties can converse by first both generating the same session key as a result of an exchange of messages over an insecure channel. Since the technique disclosed in the Hellman et al. '770 patent attempts to provide both secrecy and authentication in a public key cryptographic system, the principles of their technique will be summarized here. This should provide a better basis for an understanding of the present invention.

Figure 1:
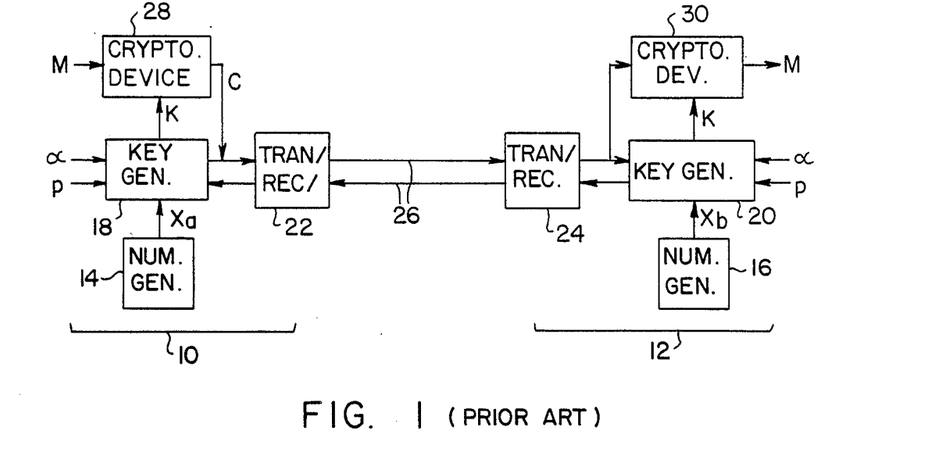
FIG. 1 is a block diagram showing a public key cryptographic system of the prior art.

In accordance with the Hellman et al. technique, two numbers $\alpha$ and p are selected for use by all users of the system, and may be made public. For increased security, p is a large prime number, and $\alpha$ has a predefined mathematical relationship to p, but these restrictions are not important for purposes of this explanation. Before starting communication, two users, A and B, indicated in FIG. 1 at 10 and 12, perform an exchange of messages that results in their both computing the same cipher key, or session key K, to be used in transmitting data back and forth between them. The first step in establishing the session key is that each user generates a secret number in a random number generator 14, 16. The numbers are designated Xa, Xb, respectively, and are selected from a set of positive integers up to p-1. Each user also has a session key generator 18, 20, one function of which is to generate other numbers Y from the numbers X, $\alpha$ and p, using the transformations:

$$Ya = \alpha^{Xa} \mod p,$$

$$Yb = \alpha^{Xb} \mod p.$$

The values Ya, Yb are then processed through a conventional transmitter/receiver 22, 24, and exchanged over an insecure communications channel 26.

The term "mod p" means modulo p, or using modulo p arithmetic. Transforming an expression to modulo p can be made by dividing the expression by p and retaining only the remainder. For example, 34 mod 17 = 0, 35 mod 17 = 1, and so forth. Similarly, the expression for Ya may be computed by first computing the exponential expression $\alpha^{Xb}$, then dividing the result by p and retaining only the remainder.

If $\alpha$ and p are appropriately chosen, it is computationally infeasible to compute Xa from Ya. That is to say, the cost of performing such a task, in terms of memory or computing time needed, is large enough to deter eavesdroppers. In any event, new X and Y values can be chosen for each message, which is short enough to preclude the possibility of any X value being computed from a corresponding Y value.

After the exchange of the values Ya, Yb, each user computes a session key K in its session key generator 18, 20, by raising the other user's Y value to the power represented by the user's own X value, all modulo p. For user A, the computation is:

$$K = Yb^{Xa} \mod p.$$

Substituting for Yb,
$$K = (\alpha^{Xb})^{Xa} \mod p = \alpha^{XaXb} \mod p.$$

For user B, the computation is:

$$K = Ya^{Xb} \mod p.$$

Substituting for Ya, $$K = (\alpha^{Xa})^{Xb} \bmod p = \alpha^{XaXb} \bmod p.$$

The two users A, B now have the same session key K, which is input to a conventional cryptographic device 28, 30. A transmitting cryptographic device, e.g. 28, transforms a plaintext message M into ciphertext C for transmission on the communications channel 26, and a receiving cryptographic device 30 makes the inverse transformation back to the plaintext M.

The Hellman et al. 770 patent points out that the generation of a session key is secure from eavesdropping, because the information exchanged on the insecure channel includes only the Y values, from which the corresponding X values cannot be easily computed. However, this form of key exchange system still has two significant problems. One is that the system is vulnerable to attack from active eavesdropping, rather than the passive eavesdropping described in the patent. The other is that identity authentication can be provided only by means of a public key directory.

Figure 2:
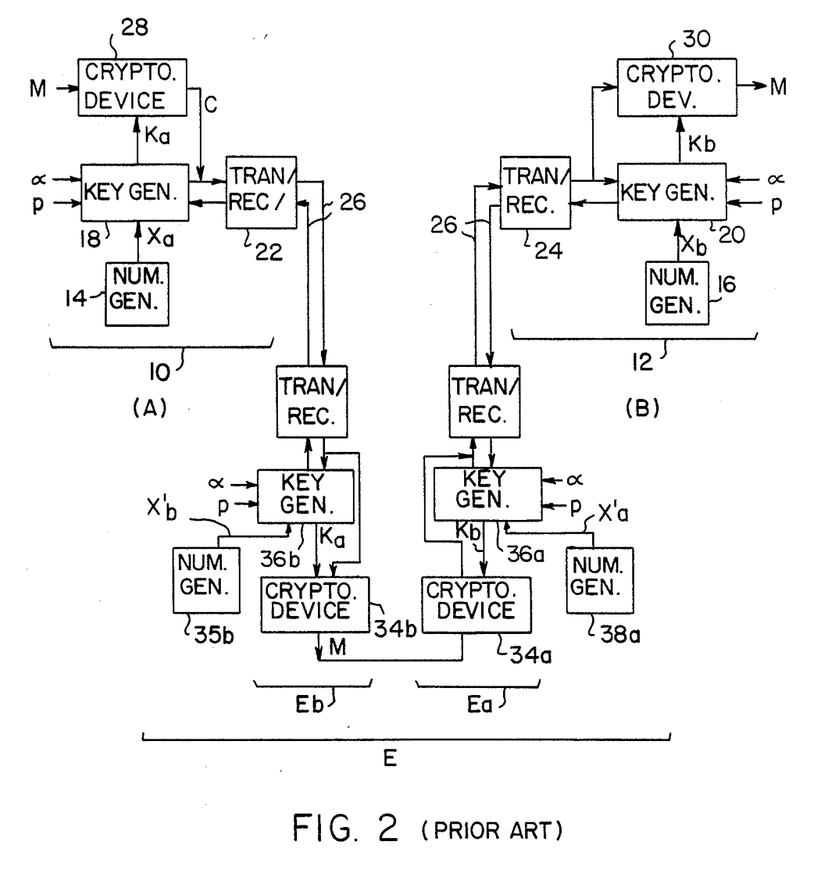
FIG. 2 is a block diagram similar to FIG. 1, and showing how active eavesdropping may be used to attack the system.

Active eavesdropping takes place when an unauthorized person places a substitute message on the communications channel. FIG. 2 depicts an example of active eavesdropping using the same components as FIG. 1. The active eavesdropper E has broken the continuity of the unsecured line 26, and is receiving messages from A and relaying them to B, while sending appropriate responses to A as well. In effect, E is pretending to be B, with device Eb, and is also pretending to be A, with device Ea. E has two cryptographic devices 34a, 34b, two session key generators 36a, 36b, and two number generators 38a, 38b. When device Eb receives Ya from A, it generates Xb' from number generator 38b, computes Yb' from Xb' and transmits Yb' to A. Device Eb and user A compute the same session key and can begin communication of data. Similarly, device Ea and user B exchange Y numbers and both generate a session key, ifferent from the one used by A and Eb. Eavesdropper E is able to decrypt the ciphertext C into plaintext M, then encipher again for transmission to B. A and B are unaware that they are not communicating directly with each other.

Figure 3:
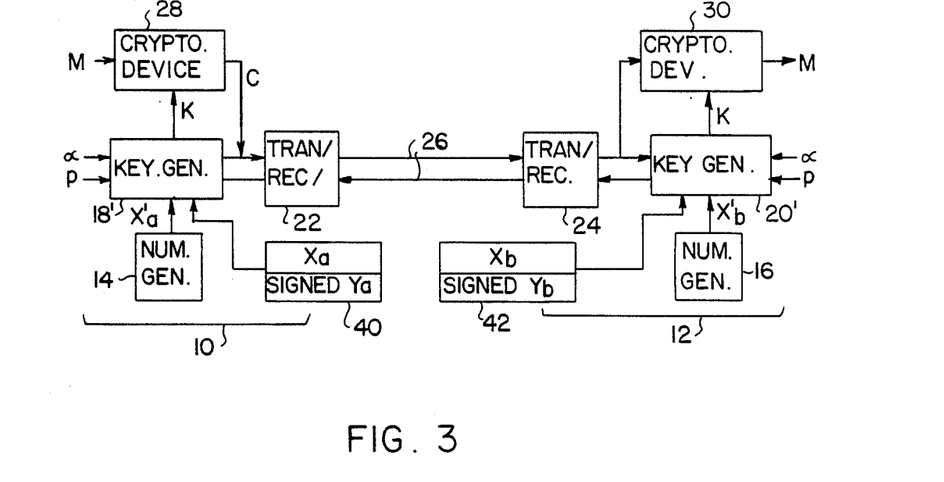
FIG. 3 is a block diagram of a public key cryptographic system in accordance with the present invention.

In accordance with the present invention, each user is provided with proof of identity of the party with whom he is conversing, and both active and passive eavesdropping are rendered practically impossible. FIG. 3 shows the key management approach of the present invention, using the same reference numerals as FIGS. 1 and 2, except that the session key generators are referred to in FIG. 3 as 18' and 20', to indicate that the key generation function is different in the present invention. The user devices also include a number storage area 40, 42. Storage area 40 contains a preselected number Xa, stored at the time of manufacture of the A device, and another number referred to as "signed Ya," also stored at the time of manufacture. Xa was chosen at random, and is unique to the device. Ya was computed from Xa using the transformation $$Ya = \alpha^{Xa} \bmod p.$$

Then the Ya value was concatenated with a number IDa uniquely identifying the user A device, such as a manufacturer's serial number, and then encoded in such a way that it was digitally "signed" by the manufacturer for purposes of authenticity. The techniques for digitally signing data are known in the cryptography art, and some will be discussed below. For the present, one need only consider that the number designated "signed (Ya,IDa)" contains the value Ya and another value IDa uniquely identifying the A device, all coded as a "signature" confirming that the number originated from the manufacturer and from no-one else. User B's device 12 has stored in its storage area 42 the values Xb and signed (Yb,IDb).

Users A and B exchange the signed (Ya,IDa) and signed (Yb,IDb) values, and each session key generator 18, 20 then "unsigns" the received values and verifies that it is conversing with the correct user device. The user identifiers IDa and IDb are known publicly, so user device A verifies that the number IDb is contained in the signed (Yb,IDb) number that was received. Likewise, user device B verifies that the value signed (Ya,IDa) contains the known value IDa. By performing the process of "unsigning" the received messages, the user devices also confirm that the signed data originated from the manufacturer and not from some other entity.

Since the Xa, Xb values are secret values, and it is infeasible to obtain them from the transmitted signed (Ya,IDa) and signed (Yb,IDb) values, the users may both compute identical session keys in a manner similar to that disclosed in the Hellman et al. '777 patent. If an eavesdropper E were to attempt to substitute fake messages for the exchanged ones, he would be unable to satisfy the authentication requirements. E could intercept a signed (Ya,IDa) transmission, could unsign the message and obtain the values Ya and IDa. E could similarly obtain the values Yb and IDb. However, in order for E and A to use the same session key, E would have to generate a value Xe, compute Ye and concatenate it with IDb, which is known, and then digitally "sign" the composite number in the same manner as the manufacturer. As will be explained, digital signing involves a transformation that is very easy to effect in one direction, the unsigning direction, but is computationally infeasible in the other, the signing direction. Therefore, eavesdropper E would be unable to establish a common session key with either A or B because he would be unable to generate messages that would satisfy the authentication requirements.

As described thus far, the technique of the invention establishes a session key that is derived from X and Y values stored in the devices at the time of manufacture. Ideally, a new session key should be established for each exchange of message traffic. An additional unsecured exchange is needed to accomplish this.

The number generator 14 in the A device 10 generates a random number X'a and the number generator 16 in the B device 12 generates a random number X'b. These are supplied to the session key generators 18, 20, respectively, which generate values Y'a and Y'b in accordance with the transformations:

$$Y'a = \alpha^{X'a} \bmod p,$$

$$Y'b = \alpha^{X'b} \bmod p.$$

These values are also exchanged between the A and B devices, at the same time that the values of signed (Ya,IDa) and signed (Yb,IDb) are exchanged. After the authenticity of the message has been confirmed, as described above, the session key generators perform the following transformations to derive a session key. At the A device, the session key is computed as $$Ka = (Y'b)^{Xa} \bmod p \oplus (Yb)^{X'a} \bmod p,$$

and at the B device, the session key is computed as $$kb = (Y'a)^{Xb} \bmod p \oplus (Ya)^{X'b} \bmod p,$$

"$\oplus$" means an exclusive OR operation.

Thus the session key is computed at each device using one fixed number, i.e. fixed at manufacturing time, and one variable number, i.e. chosen at session time. The numbers are exclusive ORed together on a bit-by-bit basis. It can be shown that Ka=Kb by substituting for the Y values. Thus:

$$\begin{aligned} Ka &= (\alpha^{X'b})^{Xa} \bmod p \oplus (\alpha^{Xb})^{X'a} \bmod p \\ &= (\alpha^{Xa})^{X'b} \bmod p \oplus (\alpha^{X'a})^{Xb} \bmod p \\ &= (Ya)^{X'b} \bmod p \oplus (Y'a)^{Xb} \bmod p \\ &= (Y'a)^{Xb} \bmod p \oplus (Ya)^{X'b} \bmod p \\ &= Kb. \end{aligned}$$

This common session key satisfies secrecy and authentication requirements, and does not require double encryption-decryption or the use of a public key directory or key distribution center. The only requirement is that of a manufacturer who will undertake to supply devices that have unique device ID's and selected X values encoded into them. For a large corporation or other organization, this obligation could be assumed by the organization itself rather than the manufacturer. For example, a corporation might purchase a large number of communications devices and complete the manufacturing process by installing unique ID's, X values, and signed Y values in the units before distributing them to the users. This would relieve the manufacturer from the obligation.

The process described above uses parameters that must meet certain numerical restrictions. The length restrictions are to ensure sufficient security, and the other requirements are to ensure that each transformation using modulo arithmetic produces a unique transformed counterpart. First, the modulus p must be a strong prime number 512 bits long. A strong prime number is a prime number p that meets the additional requirement that (p-1)/2 has at least one large prime factor or is preferably itself a prime number. The base number must be a 512-bit random number that satisfies the relationships:

$$\alpha^{(p-1)/2} \bmod p = p-1, \text{ and } 1 < \alpha < p-1.$$

Finally, the values X and X' are chosen as 512-bit random numbers such that $$1 < X, X' < p-1.$$

As indicated above, the process of authentication in the invention depends on the ability of the manufacturer, or the owner of multiple devices, to supply a signed Y value with each device that is distributed. A digital signature is a property of a message that is private to its originator. Basically, the signing process is effected by a transformation that is extremely difficult to perform, but the inverse transformation, the "unsigning," can be performed easily by every user. The present invention is not limited to the use of a particular digital signature technique.

One approach is to use an RSA public key signature technique. The RSA technique takes its name from the initial letters of its originators, Rivest, Shamir and Adleman, and is one of a class of encryption schemes known as exponentiation ciphers. An exponentiation cipher makes the transformation $C = P^e \bmod n$, where e and n constitute the enciphering key. The inverse transformation is accomplished by $P = C^d \bmod n$. With appropriate selection of n, d and e, the values of n and d can be made public without giving away the exponent e used in the encryption transformation. Therefore, a digital signature can be applied to data by performing the exponentiation transformation with a secret exponent e, and providing a public decryption exponent d, which, of course, will be effective to decrpyt only properly "signed" messages.

In the preferred embodiment of the present invention, another approach is used for digital signature, namely a modular square-root transformation. In the expression $x = m^2 \bmod n$, the number m is said to be the square root of x mod n, or the modular square root of x. If n is appropriately selected, the transformation is very difficult to perform in one direction. That is to say, it is very difficult to compute m from x, although easy to compute x from m. If the modulus n is selected to be the product of two large prime numbers, the inverse or square-root transformation can only be made if the factors of the modulus are known. Therefore, the modulus n is chosen as the product of two prime numbers, and the product is 1,024 bits long. Further, the factors must be different in length by a few bits. In the devices using the present invention, the value "signed (Ya,IDa)" is computed by first assembling or concatenating the codes to be signed. These are:

1. A numerical code IDa uniquely identifying the A device. In the present embodiment of the invention, this is a ten-digit (decimal) number encoded in ASCII format, but it could be in any desired format.
2. A number of ASCII numerical codes indicating a version number of the device. This may be used for device testing or analyzing problems relating to device incompatability.
3. The value Ya computed from the chosen value of Xa, encoded in binary form.
4. A random value added to the least-significant end of the composite message, and used to ensure that the composite message is a perfect modular square.

The last element of the message is needed because of inherent properties of the modular squaring process. If one were to list all possible values of a modular square x, from 1 to n-1, and all corresponding values of the modular square root m, some of the values of x would have multiple possible values of m, but others of the values of x would have no corresponding values of m. The value added to the end of the message ensures that the number for which a modular square root is to be computed, is one that actually has a modular square root. A simple example should help make this clear.

Suppose the modulus n is 7849. It can be verified by calculator that a value x of 98 has four possible values of m in the range 1 to n-1: 7424, 1412, 6437 and 425, such that $m^2 \bmod 7849 = 98$. However, the $\times$ value 99 has no possible modular square root values m. If the composite message to be signed had a numerical value of 99, it would be necessary to add to it a value such as making a new x value of 100, which has four possible square root values in the range 1 to n-1, namely 1326, 7839, 10 and 6523. In most instances, it does not matter which of these is picked by the modular square root process employed, since the squaring or "unsigning" process will always yield the composite message value 100 again. However, there are a few values of m that should be avoided for maximum security. If the x value is a perfect square in ordinary arithmetic (such as the number 100 in the example), two values of m that should be avoided are the square root of x by ordinary arithmetic (the number 10 in the example), and the number that is the difference between the modulus n and the ordinary-arithmetic square root of x (i.e. 7839 in the example). If a number fitting this definition is used as a signed message, the signature is subject to being "forged" without knowledge of the factors of n. Therefore, such numbers are avoided in assigning signatures, and each device can be easily designed to abort an exchange when the signed message takes the form of one of these avoided numbers.

When the modular square root process is used for digitally signing the composite data stored in each device, the "unsigning" process upon receipt of a signed composite message is simply the squaring of the message, modulo n. The value n is not made public, although it could be determined by close examination of one of the devices. Even with knowledge of the modulus n, however, the computation of the modular square root is computationally infeasible without knowledge of the factorization of n.

With a knowledge of the factorization of the modulus n, the computation of the modular square root becomes a feasible, although laborious task, which may be performed by any known computational method. It will be recalled that this process is performed prior to distribution of the devices embodying the invention, so computation time is not a critical factor.

It will be understood that the cryptographic technique of the invention may be implemented in any form that is convenient for a particular application. Modular arithmetic is now well understood by those working in the field, and may be implemented in hardware form in the manner described in the '777 Hellman et al. patent. More conveniently, off-the-shelf modular arithmetic devices are available for connection to conventional microprocessor hardware. For example, part number CY1024 manufactured by CYLINK, of Sunnyvale, Calif. 94087, performs modular addition, multiplication and exponentiation.

Figure 4:
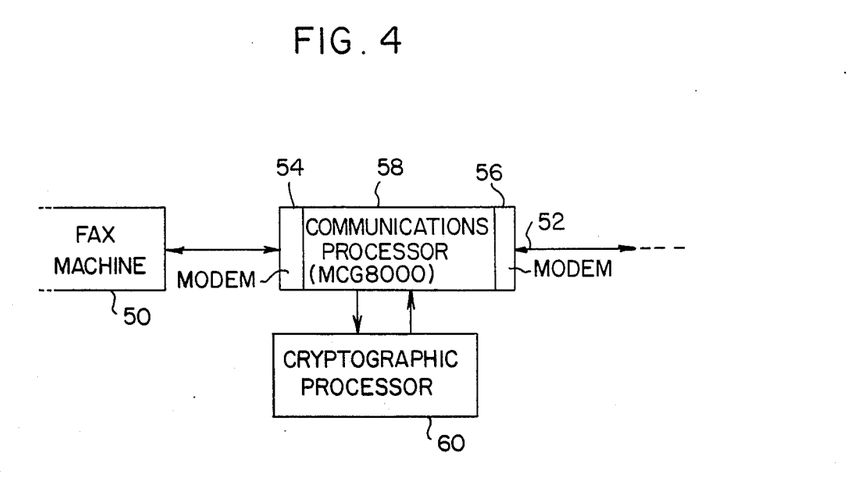
FIG. 4 is a block diagram of a secure facsimile system embodying the present invention.

For application to facsimile communications, the technique of the invention may be made completely "transparent" to the user. FIG. 4 shows the architecture of a device for connection between a conventional FAX machine 50 and a telephone line 52. The device 50 includes a first conventional modem 54 (modulator/demodulator) for connection to the FAX machine 50 and a second modem 56 for connection to the telephone line 52. The modems 54, 56 function to demodulate all messages entering the device from either the FAX machine or the telephone line, and to modulate messages for transmission to the FAX machine or onto the telephone line. The device further includes a communications processor 58 connected between the two modems 54, 56, and a cryptographic processor 60 connected to the communications processor 58. The communications processor 58 manages message traffic flow to and from the modems 54, 56 and to and from the cryptographic processor 60, and ensures that the necessary communications protocols are complied with. In one preferred embodiment of the invention, the communications processor is a microprocessor specified by part number MC68000, manufactured by Motorola Corporation.

Figure 5:
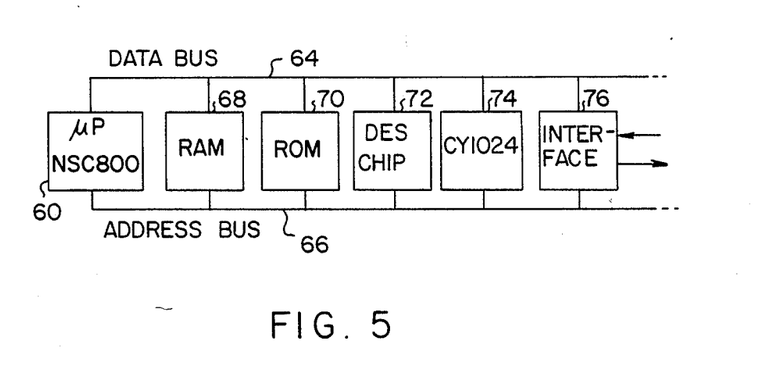
FIG. 5 is a block diagram showing more detail of the cryptographic processor of FIG. 4.

As shown in FIG. 5, the cryptographic processor 60 includes a conventional microprocessor 62 having a data bus 64 and a data bus 66, to which various other modules are connected. The microprocessor 62 may be, for example, a National Semiconductor Company device specified by part number NSC800. The connected modules include a random access memory (RAM) 68, a read-only memory (ROM) 70, which serves as a storage area for the X value and the signed Y value, an integrated-circuit chip 72 for implementation of the Data Encryption Standard (DES), a modular arithmetic device 74 such as the CYLINK CY1024, and an interface module 76 in the form of a dual-port RAM, for connection to the communications processor 58.

For transparent operation of the device shown in FIGS. 4 and 5, a user supplies not only the telephone number of a destination FAX machine, but also the ID of the intended destination FAX encoding/decoding device. When the digitally signed Y values are exchanged, the sending user device automatically "unsigns" the transmission by performing a modular squaring function; then compares the intended destination ID with the user ID returned with the Y value, and aborts the session if there is not a match. The key management steps previously described proceed automatically under control of the cryptographic processor 60, and when a session key has been derived, this is automatically applied in a conventional cryptographic process, such as the DES, to encrypt and decrypt a facsimile transmission.

It will be appreciated from the foregoing that the present invention represents a significant advance in cryptographic systems. In particular, the invention provides a technique for establishing a common session key for two users by means of an exchange of messages over an insecure communications channel. What distinguishes the invention from prior approaches to public key exchange systems is that the technique of the invention provides for identity authentication of the users without the need for a key distribution center or a public key register. Further, the technique is resistant to both passive and active eavesdropping. It will also be appreciated that, although an embodiment of the invention has been described in detail for purposes of illustration, various modifications may be made without departing from the spirit and scope of the invention. Accordingly, the invention is not to be limited except as by the appended claims.

I claim:

1. A secure key generator, comprising:
   storage means for storing a number of a first type selected prior to placing the key generator in service, and a digitally signed composite quantity containing both a unique and publicly known identifier of the key generator and a number of a second type obtained by a practically irreversible transformation of the number of the first type;
   a first input connected to receive the number of the first type;
   a second input connected to receive an input quantity transmitted over an insecure communications channel from another key generator, the input quantity being digitally signed and containing both a publicly known identifier of the other key generator and a number of the second type generated by a practically irreversible transformation of a number of the first type stored in the other key generator;

a first output for transmitting the stored, digitally signed composite quantity over the insecure communications channel to the other key generator;

a second output;

means for decoding the signed input quantity received at the second input, to obtain the identifier of the other key generator and the received number of the second type; and means for generating a session key at the second output, by performing a practically irreversible transformation of the number of the second type received through the second input, using the number of the first type received through the first input.

2. A secure key generator as defined in claim 1, wherein the key generator further comprises:

a third input, connected to receive another number of the first type, generated randomly;

means for generating at the first output, for transmission with the digitally signed composite quantity, a number of the second type obtained by a practically irreversible transformation of the number of the first type received through the third input; and means for receiving from the second input another number of the second type generated in and transmitted from the other key generator;

and wherein the means for generating a session key performs a practically irreversible transformation involving both numbers of the first type, received at the first and third inputs, and both numbers of the second type received at the second input, whereby a different session key may be generated for each message transmission session.

3. A secure key generator as defined in claim 2, wherein:

the number of the second type stored in digitally signed form in the storage means is obtained by the transformation $Ya = \alpha^{Xa} \mod p$, where Xa is the number of the first type stored in the storage means, and $\alpha$ and p are publicly known transformation parameters;

the number of the second type received in the digitally signed composite quantity from the other key generator is designated Yb; and the means for generating the session key performs the transformation $$K = (Y'b)^{Xa} \mod p \oplus (Yb)^{X'a} \mod p,$$

where X'a is the number of the first type that is randomly generated, Y'b is the additional number of the second type received from the other key generator, and the $\oplus$ symbol denotes an exclusive OR operation.

4. A secure key generator as defined in claim 1, wherein:

the number of the second type stored in digitally signed form in the storage means is obtained by the transformation $Ya = \alpha^{Xa} \mod p$, where Xa is the number of the first type stored in the storage means, and $\alpha$ and p are publicly known transformation parameters;

the number of the second type received in the digitally signed composite quantity from the other key generator is designated Yb; and the means for generating the session key performs the transformation $K = Yb^{Xa} \mod p$.

5. A method of generating a secure session key between two user devices connected by an insecure communications channel, comprising the following steps performed at both devices:

transmitting a digitally signed composite quantity to the other device, the composite quantity including a publicly known device identifier IDa and a number Ya derived by a practically irreversible transformation of a secret number Xa that it is unique to the device;

receiving a similarly structured digitally signed composite quantity from the other device;

transforming the received digitally signed composite quantity into an unsigned composite quantity containing a device identifier IDb of the other device and a number Yb that was derived by transformation from a secret number Xb that is unique to the other device;

verifying the identity of the other device from the device identifier IDb; and generating a session key by performing a practically irreversible transformation involving the numbers Xa and Yb.

6. A method as defined in claim 5, and further including the steps of:

generating another number X'a randomly prior to generation of a session key;

transforming the number X'a to a number Y'a using a practically irreversible transformation;

transmitting the number Y'a to the other device; and receiving a number Y'b from the other device;

wherein the step of generating a session key includes a practically irreversible transformation involving the numbers Xa, X'a, Yb and Y'b.

7. A method as defined in claim 6, wherein:

the transformations from X numbers to Y numbers is of the type $Y = \alpha^X \mod p$, where $\alpha$ and p are chosen to maximize irreversibility of the transformations; and the step of generating a session key includes the transformation $$K = (Y'b)^{Xa} \mod p \oplus (Yb)^{X'a} \mod p,$$

where $\oplus$ denotes an exclusive OR operation.

8. A method of authentication in a public key cryptographic system, the method comprising the steps of:

selecting a unique random number Xi for each cryptographic device to be distributed;

transforming the number Xi to a new number Yi using a practically irreversible transformation;

forming a composite quantity by combining the number Yi with a publicly known device identifier IDi;

digitally signing the composite quantity containing Yi and IDi;

storing the signed composite quantity and the number Xi permanently in each device;

exchanging, between two devices, a and b, desiring to establish secured communication, the signed composite quantities stored in each;

authenticating, in each of the two devices, the identity of the other device; and generating, in each of the two devices, a session key to be used for secured communication.

9. A method as defined in claim 8, wherein the step of authenticating includes:

transforming the digitally signed composite quantity received from the other device into unsigned form; and comparing the value of IDb in the unsigned quantity with the known IDb of the other device.

10. A method as defined in claim 9, wherein: the step of generating the session key includes performing a transformation that involves a value Yb received from the other device and the value Xa of this device.

11. A method as defined in claim 10, wherein: the step of digitally signing includes computing a modular square root of the composite quantity;
the step of transforming the digitally signed composite quantity to unsigned form includes computing a modular square of the signed quantity.

12. A method as defined in claim 11, wherein:
the steps of computing a modular square root and computing a modular square both employ a modulus that is the product of two prime numbers.

13. A method as defined in claim 8, and further comprising the steps of:
transforming, in each of the two devices, the digitally signed composite quantity received from the other device into unsigned form; and
generating, in each of the two devices, a, b, a random number $X'a$, $X'b$;
transforming the numbers $X'a$, $X'b$ into numbers $Y'a$, $Y'b$ by a transformation that is practically irreversible; and
exchanging the numbers $Y'a$, $Y'b$ between the two devices;
and wherein the step of generating the session key includes performing a practically irreversible transformation involving the numbers Xa, $X'a$, Yb, and $Y'b$ in device a, and the numbers Xb, $X'b$, Ya, and $Y'a$ in device b.

14. A method as defined in claim 13, wherein:
the transformations from X numbers to Y numbers is of the type $Y = \alpha^X \bmod p$, where $\alpha$ and p are chosen to maximize irreversibility of the transformations; and
the step of generating a session key includes the transformations $$K = (Y'b)^{Xa} \bmod p \oplus (Yb)^{X'a} \bmod p,$$

for device a, and $$K = (Y'a)^{Xb} \bmod p \oplus (Ya)^{X'b} \bmod p,$$

for device b, where $\oplus$ denotes an exclusive OR operation.

15. A method as defined in claim 13, wherein:
the step of digitally signing includes computing a modular square root of the composite quantity;
the step of transforming the digitally signed composite quantity to unsigned form includes computing a modular square of the signed quantity.

16. A method as defined in claim 15, wherein:
the steps of computing a modular square root and computing a modular square both employ a modulus that is the product of two prime numbers.

* * * * *